Patented Aug. 13, 1929.

1,724,886

UNITED STATES PATENT OFFICE.

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE.

MANUFACTURE OF REFRACTORY COMPOSITIONS.

No Drawing. Application filed June 1, 1925. Serial No. 34,175.

My invention relates to the manufacture of refractory parts such as are used in the handling of molten glass, and it relates particularly to the preparation of the batch from which these parts are molded.

More specifically, my invention aims to improve the manufacture of refractory blocks and other refractory parts by preparing in an improved manner the grog which is commonly employed in refractory compositions, whereby the grog, and consequently the finished refractory, shall be as dense and free from voids as is possible, consistently with long life under operating conditions.

In the manufacture of glass-tank blocks and similar clay refractories, it is customary to employ as an ingredient in the final batch a grog consisting of clay which has previously been mixed, fired and ground. The ordinary method of making this grog, even when the final product is to be dry-pressed, consists in moistening the clay to form a paste, mixing the wet clay in a pug mill or otherwise, separating the mixed material into more or less formless pieces of convenient size, drying and firing these pieces, and grinding the fired material. Since the grog batch is mixed under light pressure, it is not very compact and contains many interstices which are generally filled with water. When the batch is dried and fired, the free moisture is eliminated, leaving voids which may be termed "moisture voids". Grog prepared in this manner gives the final refractory a considerable degree of porosity which reduces its resistance to corrosion when brought into contact with chemically active substances such as molten glass.

According to my present invention, I prepare grog by dry-pressing the grog batch in confinement, as in a mold, and under sufficient pressure to compact the dry powdered batch into solid form. The raw materials are first ground and are dried, if necessary, to give them a free moisture content only sufficient to cause the batch to hold together when pressed according to the usual dry-pressing process. This moisture content may be about twelve per cent by weight, and the powdered material having this content of moisture appears dry when examined and handled. This material, after preliminary mixing in powdered condition if more than one ingredient is used, is then compacted by molding under heavy pressure into dense blocks by the methods ordinarily employed for dry-pressing clay and like substances. The shape of these blocks has no particular relation to the shape of the finished articles which are to be made, and they may be given any form convenient for proper and rapid manufacture. These preliminary blocks are then burned to the desired degree, the burning being carried out by ordinary means and methods and at ordinary temperatures. After burning, the blocks are broken up and reduced to the required size and are then used for grog in the final batch.

The characteristic of my present invention is the mold-pressing of the raw batch for the preliminary blocks, whereby the finished grog is rendered so free from voids as to have materially less apparent porosity and true porosity than grog heretofore used in making refractories so that the grog portion of the final article is highly resistant to the action of molten glass and like molten substances. The molding pressure may be as high as is practically convenient, and may be of the order of 200 to 300 pounds or more per square inch.

The materials used in the preparation of the grog are determined by the desired characteristics of the finished product, and may include the same ingredients as the finished product in any proportions which may be found convenient. This invention may advantageously be applied to the preparation of fire-clay refractories for contact with molten glass, such as tank blocks, feeder parts and the like, but is not restricted to this use, being intended for general application in the manufacture of refractories where the use of previously burnt grog is usual or desirable. It will therefore be understood that my invention is not restricted in respect to the materials and process steps employed, except as indicated in the appended claims.

I claim as my invention:

1. As a new article of manufacture, a dry-pressed refractory grog that is capable, when assembled into a refractory block, of withstanding the corroding action of molten glass by reason of the density and freedom from pores imparted to it by dry pressing.

2. As a new article of manufacture, a refractory containing dry-pressed grog that is capable, when assembled into a refractory block, of withstanding the corroding action of molten glass by reason of the density and freedom from pores imparted to it by dry pressing.

3. The process of making refractory grog which comprises compacting powdered refractory material in confinement, and firing and grinding the compacted material.

4. The process of making refractory grog which comprises compacting, in a mold, powdered refractory clay containing only sufficient moisture to bind the compacted material, and firing and grinding said compacted material.

5. The process of making refractory grog which comprises dry-pressing finely divided refractory material under pressure in excess of 200 pounds per square inch, and firing and grinding the compacted material.

6. The process of making refractory grog which comprises dry-pressing finely divided refractory clay in a mold under pressure in excess of 200 pounds per square inch and firing and grinding the compacted material.

Signed at Hartford, Conn., this 29th day of May 1925.

KARL E. PEILER.